Jan. 16, 1951  C. S. BENEDICT  2,538,551
SIGNALING DEVICE FOR FISHING LINES
Filed July 11, 1947

Inventor

Clinton S. Benedict

By *Clarence A. O'Brien and Harvey B. Jacobson*
Attorneys

Patented Jan. 16, 1951

2,538,551

UNITED STATES PATENT OFFICE 2,538,551

SIGNALING DEVICE FOR FISHING LINES

Clinton S. Benedict, Katonah, N. Y.

Application July 11, 1947, Serial No. 760,428

2 Claims. (Cl. 43—17)

This invention relates to new and useful improvements in signalling devices for fishing lines and the primary object of the present invention is to provide a signal device particularly useful in ice fishing whereby the signal is actuated by a pull on the fishing line.

Another important object of the present invention is to provide a signalling device including novel and improved counter-balancing means for normally retaining the device in a non-indicating position.

A further object of the present invention is the provision of an indicating device for fishing lines, the trip mechanism of which is readily and quickly actuated by a slight pull on the line resulting from a fish striking the same.

A still further aim of the present invention is to provide a signal device for the foregoing purposes that is simple and practical in construction, efficient and reliable in use, relatively inexpensive to manufacture, and otherwise well adapted for the purposes for which the same is intended.

Figure 1:
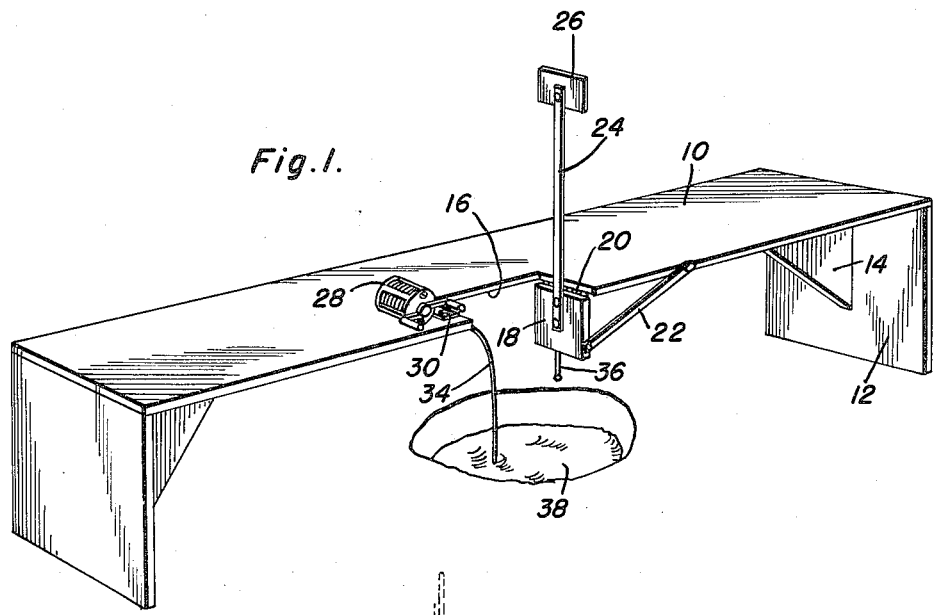
Figure 2:
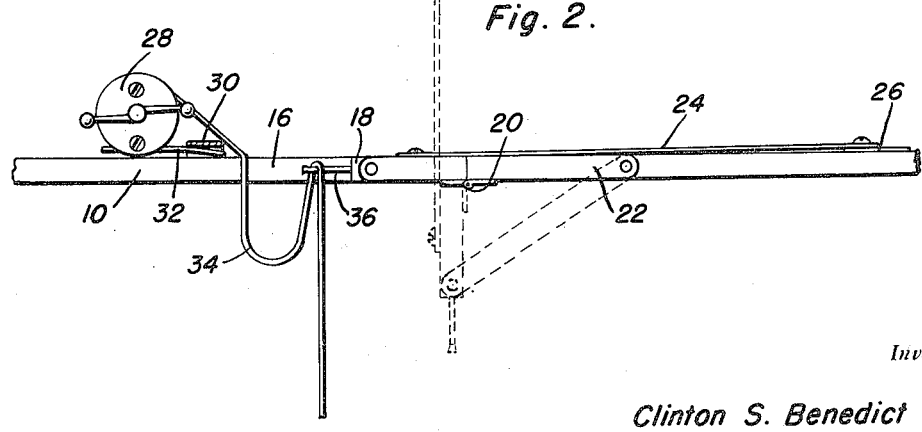

Other objects and advantages reside in the details of construction and operation as more fully hereinafter described and claimed, reference being had to the accompanying drawings forming part hereof, wherein like numerals refer to like parts throughout, and in which:

Figure 1 is a perspective view of the present invention shown in an actuated position; and, Figure 2 is a fragmentary side elevational view of the present invention showing the same in a non-indicating position, and with dotted lines showing the position of the signal when actuated.

Referring now to the drawings in detail, wherein for the purpose of illustration, there is disclosed a preferred embodiment of the present invention, the numeral 10 represents a flat substantially rectangular platform supported in an elevated horizontal position by a pair of side members 12 secured to each end thereof.

The side members are preferably braced to the platform by triangular braces 14.

One side of the platform is provided with a preferably rectangular notch 16 at the longitudinal center of the platform, which receives an actuating member or plate 18 hinged to one transverse edge of the notch, as at 20. This member occupies only a portion of the notch and is so hinged to the platform that it may swing downwardly at right angles to the platform.

One end of a rubber band 22 or the like is fixedly secured to the outer longitudinal edge of member 18 and the opposite end of said band is fixedly secured to the longitudinal edge of the platform. This band tends to hold member 18 downwardly.

Removably secured to the upper plate or member 18, is one terminal portion of an elongated arm or post 24 having a substantially rectangular signal plate 26 of any suitable type removably secured to its free end.

The arm 24 and signal plate 26 normally overlie the platform to retain member 18 in a raised horizontal position, with the band 22 extending horizontally across the hinge 20 and along side of the platform 10 and member 18, as shown best in Figure 2 of the drawing.

In practical use of the device, a fishing reel 28 is secured to the upper face of the platform by a bracket 30 bearing against the attaching arm 32 of said reel.

A line 34 wound on said reel is loosely extended about a nail or arm 36 projecting outwardly from one end of the member 18 at the opposite side thereof from arm 24. The line may then be extended vertically downward through an opening 38 provided in the ice beneath notch 16 and into the water beneath the ice.

When a fish engages the line and pulls the same, the line will become taut thereby pulling member 18 downwardly with the aid of band 22. As the member is swung downwardly and vertically, arm 24 and plate 26 is swung outwardly and vertical to indicate that a fish has struck the line.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. An appliance for fishing through the ice, said appliance comprising a bench including a horizontal platform and side members for supporting the platform above the ice, said platform having a central portion and a side edge, a notch provided in the side edge of the platform at the central portion thereof, an actuating member, a horizontal pivot securing said actuating member to said platform for vertical swinging movement of said actuating member into and out of the notch, a signal arm secured to the upper face of said actuating member and extending across and overlying the pivot and resting upon the platform to retain the actuating member raised and within the notch, a spring element secured to the actuating member and to the platform and extending transversely across the hinged end of said actuating member for urging the actuating member to a lowered and vertical position when a slight downward pressure is applied to the actuating member sufficient to urge the spring element below the pivot, a fishing line mounted on the platform and extending downwardly through the notch, and a further arm carried by the member and receiving said line, a downward pressure being applied to the actuating member by a downward pull on the line to lower the spring element below the pivot.

2. The combination of claim 1 wherein said spring element includes an elongated resilient strap having first and second end portions, the first end portion of said resilient strap being secured to the side edge of said platform adjacent the notch, the second end portion of said resilient strap being secured to said member.

CLINTON S. BENEDICT.

REFERENCES CITED

The following references are of record in the file of this patent:

UNITED STATES PATENTS

| Number | Name | Date |
|---|---|---|
| 440,147 | Fox | Nov. 11, 1890 |
| 1,443,981 | Eccleston | Feb. 6, 1923 |
| 1,973,869 | Gloor | Sept. 18, 1934 |

OTHER REFERENCES

"A Compact Ice-Fishing Kit," by Alrik Wallgren, in Field & Stream, February 1939, pages 54 and 56.

Popular Mechanics, Feb. 1939, (page 279).